United States Patent
Zoumaras et al.

(10) Patent No.: US 9,340,248 B2
(45) Date of Patent: *May 17, 2016

(54) MECHANICAL RESTRAINT FOR SECURING MOTORCYCLE RIDER FOOTWEAR TO FOOTPEG

(71) Applicant: EVOLUTION RACING PRODUCTS, LLC, San Diego, CA (US)

(72) Inventors: Steven G. Zoumaras, San Diego, CA (US); John J. Emerson, El Cajon, CA (US); Ryan Ragland, Temecula, CA (US)

(73) Assignee: EVOLUTION RACING PRODUCTS, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/331,181

(22) Filed: Jul. 14, 2014

(65) Prior Publication Data

US 2014/0319801 A1 Oct. 30, 2014

Related U.S. Application Data

(63) Continuation of application No. 13/222,777, filed on Aug. 31, 2011, now Pat. No. 8,794,106.

(51) Int. Cl.
*B62J 25/00* (2006.01)
*B62M 3/08* (2006.01)
*A43B 5/14* (2006.01)

(52) U.S. Cl.
CPC . *B62J 25/00* (2013.01); *A43B 5/14* (2013.01); *A43B 5/145* (2013.01); *B62M 3/086* (2013.01); *Y10T 74/217* (2015.01)

(58) Field of Classification Search
CPC .......... B62M 3/08; B62M 3/086; B62J 25/00; A43B 5/14; A43B 5/145; Y10T 74/217
See application file for complete search history.

(56) References Cited

U.S. PATENT DOCUMENTS 3,960,027 A * 6/1976 Magnuson .................. 74/594.6
4,089,236 A * 5/1978 Genzling .................... 74/594.4

(Continued)

OTHER PUBLICATIONS

EPO Communication pursuant to Article 94(3) EPC (Office Action) of corresponding European Patent Application No. 12755942.5; ref. D2, U.S. Patent Application Publication No. US 2003/0066384 A1 (cited in International Search Report and Written Opinion of the International Search Authority for PCT Application No. PCT/US2012/052522 in the Information Disclosure Statement filed on Mar. 13, 2013 in parent U.S. Appl. No. 13/222,777 (now U.S. Pat. No. 8,794,106 B2).

*Primary Examiner* — Joseph Rocca
*Assistant Examiner* — Maurice Williams
(74) *Attorney, Agent, or Firm* — Jonathan L. Pettit, Esq.; Duckor Spradling Metzger & Wynne (57) ABSTRACT

A restraint is configured to restrain a rider's footwear to a motorcycle footpeg along at least a nearly vertical first axis. The footpeg extends away from the motorcycle along a second axis. The restraint is based upon a combination of a hook and a clasp. The restraint can be engaged by linearly moving the footwear alternatively along either of two axes including the first axis, and a third axis that is mutually perpendicular to the first and second axes. The restraint may also be disengaged by linearly moving the footwear along the third axis. The third axis generally passes from the heel to toe of the footwear. Moving the footwear in a backward direction (toe to heel direction) engages the restraint; moving the footwear in a forward direction (heel to toe direction) disengages the restraint.

1 Claim, 9 Drawing Sheets

(56) References Cited

U.S. PATENT DOCUMENTS

| | | | | |
|---|---|---|---|---|
| 4,298,210 A * | 11/1981 | Lotteau et al. | | 280/259 |
| 4,488,453 A * | 12/1984 | Drugeon et al. | | 74/594.6 |
| 4,538,480 A * | 9/1985 | Trindle | | 74/594.5 |
| 4,640,151 A * | 2/1987 | Howell | | 74/594.6 |
| 4,809,563 A * | 3/1989 | Loppnow | | 74/594.6 |
| 4,856,365 A * | 8/1989 | Romano | | 74/594.6 |
| 4,864,887 A * | 9/1989 | Rapisarda | | 74/594.6 |
| 4,893,523 A * | 1/1990 | Lennon | | 74/594.6 |
| 4,898,063 A * | 2/1990 | Sampson | | 74/594.6 |
| 4,932,287 A * | 6/1990 | Ramos | | 74/594.6 |
| 4,969,375 A * | 11/1990 | v.d.Osten-Sacken et al. | | 74/594.6 |
| 5,007,185 A * | 4/1991 | Lazarski | | 36/135 |
| 5,014,571 A * | 5/1991 | Dapezi | | 74/594.6 |
| 5,060,537 A * | 10/1991 | Nagano | | 74/594.6 |
| 5,081,883 A * | 1/1992 | Romano | | 74/594.6 |
| 5,131,291 A * | 7/1992 | Beyl | | 74/594.6 |
| 5,170,574 A * | 12/1992 | Weisbrich | | 36/131 |
| 5,259,270 A * | 11/1993 | Lin | | 74/594.6 |
| 5,442,976 A * | 8/1995 | Cheng | | 74/594.6 |
| 5,505,111 A * | 4/1996 | Nagano | | 74/594.6 |
| 5,546,829 A * | 8/1996 | Bryne | | 74/594.6 |
| 5,557,985 A * | 9/1996 | Nagano | | 74/594.6 |
| 5,575,184 A * | 11/1996 | De Schrijver | | 74/594.6 |
| 5,634,383 A * | 6/1997 | Lin | | 74/594.6 |
| 5,662,006 A * | 9/1997 | Angeltun | | 74/594.4 |
| 5,765,450 A * | 6/1998 | Kruger et al. | | 74/594.6 |
| 6,161,859 A * | 12/2000 | Cheng | | 280/291 |
| 6,276,235 B1* | 8/2001 | Heim | | 74/594.6 |
| 6,477,917 B1* | 11/2002 | Peyre et al. | | 74/594.6 |
| 6,543,309 B2* | 4/2003 | Heim | | 74/594.6 |
| 6,543,310 B1* | 4/2003 | Baker et al. | | 74/594.6 |
| 6,792,703 B2* | 9/2004 | Cohen | | 36/136 |
| 6,957,821 B2* | 10/2005 | Gorman et al. | | 280/291 |
| 7,021,175 B1* | 4/2006 | Xie | | 74/594.6 |
| 7,073,409 B2* | 7/2006 | Ho | | 74/594.6 |
| 7,178,272 B2* | 2/2007 | Xie | | 36/131 |
| 7,228,760 B2* | 6/2007 | Reboullet | | 74/594.6 |
| 7,526,982 B2* | 5/2009 | Chen | | 74/594.6 |
| 7,571,544 B2* | 8/2009 | Champoux et al. | | 33/1 N |
| 7,581,338 B1* | 9/2009 | Housley et al. | | 36/131 |
| 7,644,521 B2* | 1/2010 | McCarron | | 36/136 |
| 8,065,933 B2* | 11/2011 | Coderre | | 74/594.6 |
| 8,453,353 B2* | 6/2013 | Xie | | 36/131 |
| 8,464,608 B2* | 6/2013 | Chen | | 74/594.6 |
| 2003/0066384 A1 | 4/2003 | Baker et al. | | |
| 2004/0035624 A1* | 2/2004 | Fecteau et al. | | 180/210 |
| 2008/0179859 A1* | 7/2008 | Boehmke et al. | | 280/291 |
| 2009/0229146 A1* | 9/2009 | Yanke et al. | | 36/131 |
| 2009/0250282 A1* | 10/2009 | Davis et al. | | 180/233 |
| 2011/0219911 A1* | 9/2011 | Zoumaras et al. | | 74/594.6 |
| 2012/0132030 A1* | 5/2012 | Kamada | | 74/594.6 |

* cited by examiner

MECHANICAL RESTRAINT FOR SECURING MOTORCYCLE RIDER FOOTWEAR TO FOOTPEG

RELATED APPLICATION

This application claims priority to, and is a continuation of, U.S. non-provisional patent application, application Ser. No. 13/222,777, entitled MECHANICAL RESTRAINT FOR SECURING MOTORCYCLE RIDER FOOTWEAR TO FOOTPEG, filed on Aug. 31, 2011, and PCT patent application, Application No. PCT/US12/52522, entitled MECHANICAL RESTRAINT FOR SECURING MOTORCYCLE RIDER FOOTWEAR TO FOOTPEG, filed on Aug. 27, 2012, each of which is assigned to the same assignee with the same inventors, and is incorporated herein by reference in its entirety.

FIELD OF THE INVENTION

The present invention concerns an improvement in a restraint of a rider to a motorcycle. More particularly, the present invention includes a mechanical hook and clasp system that provides advantages unique to motorcycle riding.

BACKGROUND OF THE INVENTION

A motorcycle includes a seat on which a rider is seated and at least one pair of footpegs (foot supports) located at a lower portion of the vehicle relative to the seat. Included are foot-operated controls in close proximity to the footpegs such as a brake and a gearshift. While in forward motion and in normal riding, the rider's feet typically rest upon the footpegs. This is typically quite acceptable for riding on paved and/or smooth roads.

However, if the rider encounters very rough terrain or jumps, the shaking may cause the rider's feet to lose contact with the footpegs. The loss of contact may be very dangerous. Experienced riders compensate for this by gripping the sides of the seat with their knees and/or thighs and hanging on to the handlebars. An example of such an experienced rider is a Motocross competitor who routinely rides over very rough terrain and jumps.

Yet riding this way does not maintain an ideal amount of control for a Motocross competition. Various mechanical foot restraints for bicycling and motorcycles have been proposed in the past. Bicycle restraints require that the foot remains constrained during a full circle of pedal motion. This over-constrains the foot in a way that is not acceptable for a motorcycle. For example bicycle-configured restraints do not allow for ease of shifting and breaking using motorcycle foot controls. Not being able to quickly and easily exit a restraint can be a safety issue on a motorcycle.

For a motorcycle, the predominate riding position has the rider with the arch of the rider's boot centered over the footpeg. This footpeg/boot positional relationship allows the rider to reach the gear shift with the left toe, and the rear brake with the right toe. For a skilled rider, the most beneficial position for the feet to navigate rough or difficult terrain is with the ball of the foot centered over the pegs. When a skilled rider needs to shift or brake he moves his foot back to the arch-centered position in order to activate the controls. The ease of being able to move the foot from ball-centered to arch-centered is a key factor for the application of foot restraint to a motorcycle.

The solutions offered for motorcycles have been few in number. Issues with prior designs include ease of entry, ease of exiting, providing adequate vertical restraint, and allowing for shifting and breaking using foot controls. What is desired is a mechanical restraint that addresses all of these issues with motorcycles

DETAILED DESCRIPTION OF THE PREFERRED EMBODIMENTS

The foregoing describes axes and directions. An axis extends in two directions and is generally only defined by its orientation. A direction refers to one of two opposing or opposite directions that are parallel to an axis. Axes and directions hereafter are defined relative to the restraint system being described and don't necessarily have a more general meaning. More specifically axes and directions described are defined relative to the geometry of a clasp and hook system used to restrain a motorcycle rider to a motorcycle regardless of the absolute orientation of the hook and clasp system.

Figure 1:
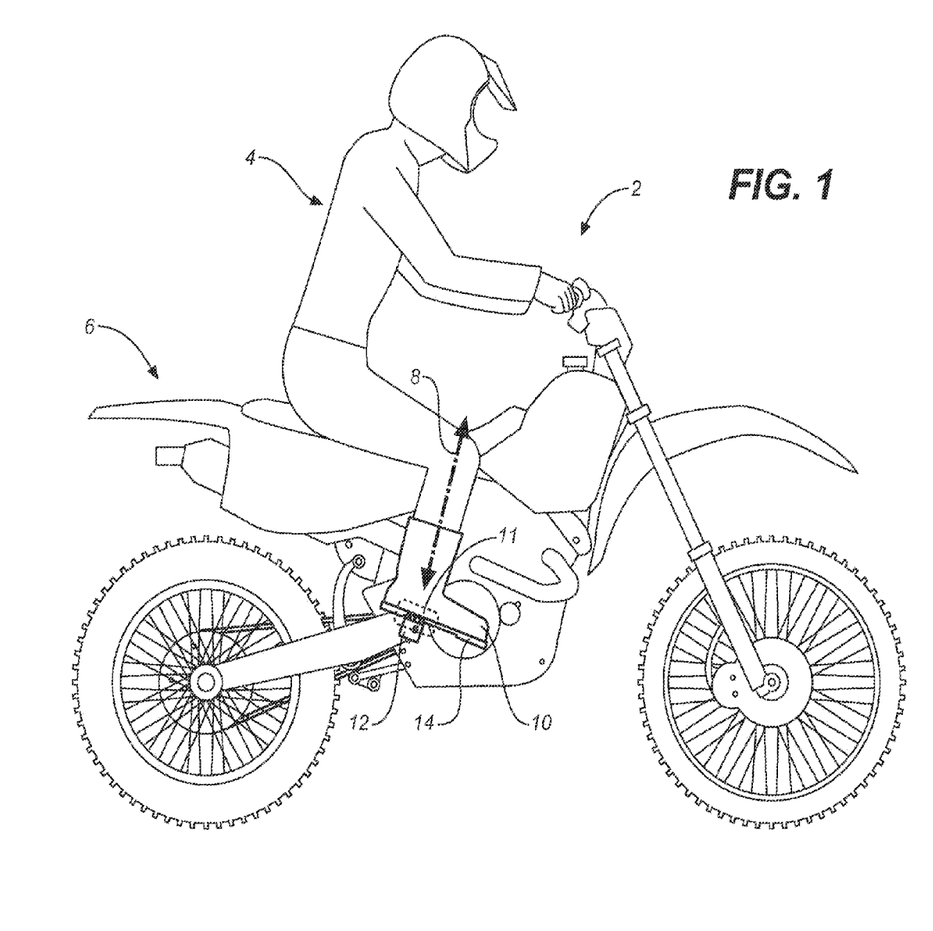
FIG. 1 depicts a rider on a motorcycle utilizing a restraining system of the present invention.

A system 2 according to the present invention is depicted in FIG. 1 including a rider 4 being restrained to a motorcycle 6 along a nearly vertical first axis 8. To provide this restraint, the footwear or boot 10 of rider 4 is restrained to motorcycle footpeg 12 utilizing a hook and clasp system of the present invention. Hereafter the combination of the hook and clasp will be referred to as the "restraint" 11. Footpeg 12 extends laterally and outwardly from motorcycle 6 along a second axis that is perpendicular to the first axis 8 (direction is out of the page in FIG. 1). In the illustrations that follow, the footpeg 12 incorporates a clasp and the hook is incorporated into a sole 14 of footwear 10. The restraint of the present invention can be any number of devices which restrain the footwear or boot 10 to the footpeg 12, including alternative embodiments where the hook may form a portion of footpeg 12 and the clasp is incorporated into footwear 10.

The hook and clasp of the present invention enables very simple alternative methods of engagement and disengagement of the restraint 11. The rider 4 can engage the restraint 11 in either of two directions. The rider 4 can press the restraint 11 together with a single linear motion of boot 10 along the first axis 8. Alternatively the rider 4 can linearly engage the restraint 11 with a single linear motion along a third axis that is mutually perpendicular to the first and second axes and is along the long axis of the sole 14. To disengage the restraint 11, this can be done by a single linear motion in an opposite direction along the third axis. Alternatively rider 4 can disengage restraint 11 with an angular twist of sole 14. Thus engagement and disengagement of restraint 11 can each be performed in at least two different and distinct ways for the convenience of rider 4.

Restraint 11 also restrains footwear 10 along two directions during engagement of hook to clasp. As will become apparent in the foregoing, restraint 11 restrains against an upward motion along second axis 8 and against backward motion along the third axis.

Figure 2A:
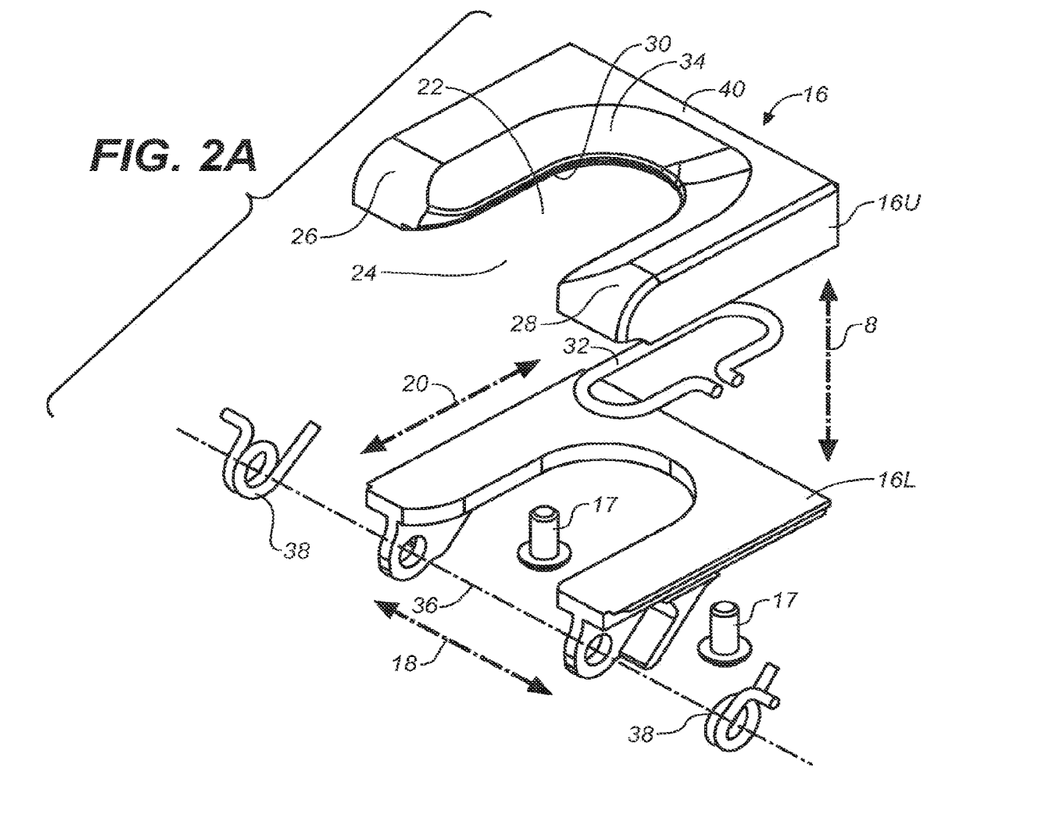
FIG. 2A is an exploded isometric drawing depicting a clasp utilized by the present invention.
Figure 2B:
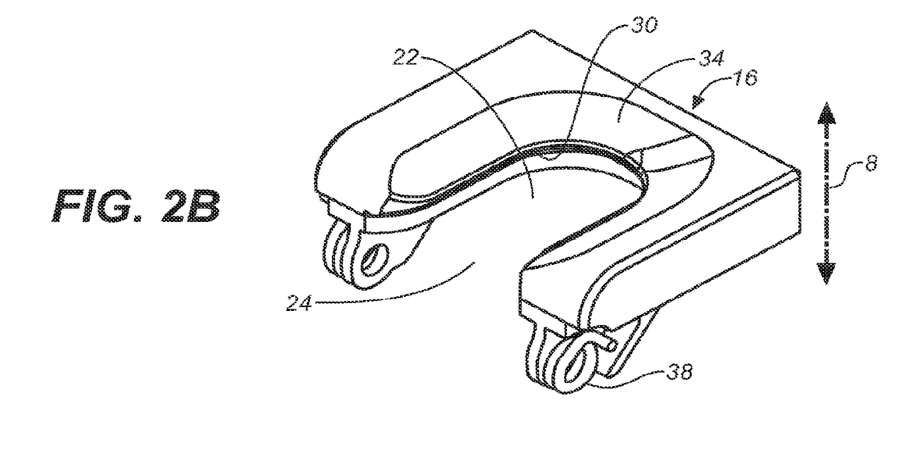
FIG. 2B is an assembled isometric drawing of a clasp utilized by the present invention.
Figure 2C:
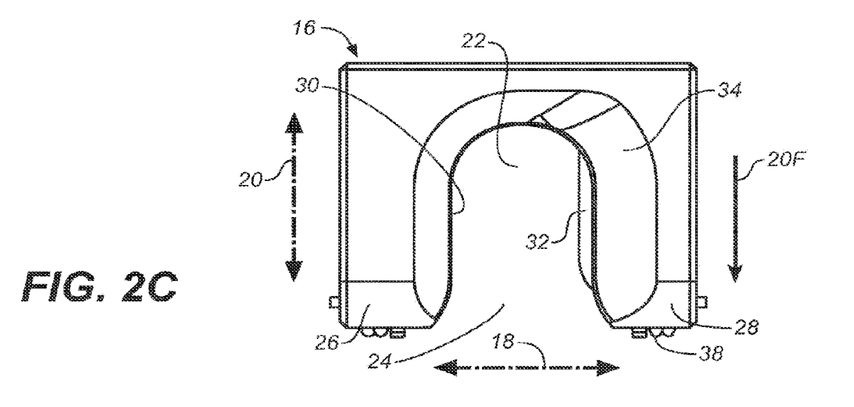
FIG. 2C is a top view of a clasp of the present invention.
Figure 3:
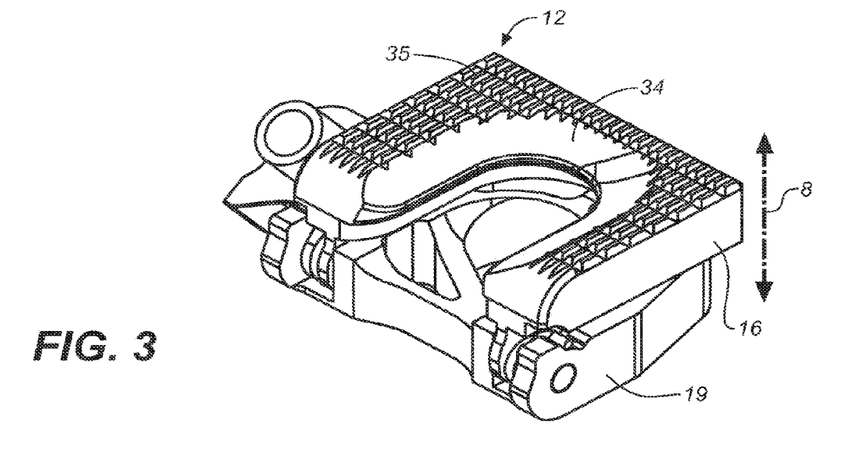
FIG. 3 is an isometric view of a footpeg of the present invention having a textured or knurled upper surface.

A clasp 16 according to the present invention is depicted in FIGS. 2A-C and FIG. 3. FIG. 2A depicts an exploded isometric view, FIG. 2B depicts an isometric view, and FIG. 2C depicts a top view. FIG. 3 depicts a variant of clasp 16 having a knurled or textured upper surface 35. Also depicted are various axes to be discussed including the first nearly vertical axis 8, the second axis 18 that extends along the footpeg 12 outwardly and laterally from the motorcycle 6, and a third axis 20 that is mutually perpendicular to the first 8 and second 18 axes and extends along the length of the sole of footwear 10. Clasp 16 may be mounted to motorcycle 6 in a manner similar to that of a conventional footpeg and hence replaces a conventional footpeg. The first, second, and third axis orientations are defined with respect to the hook and clasp restraint 11. Thus, if the clasp 16 rotates, then the axes rotate with it.

Directions are also defined that are parallel to respective axes. For first axis 8 there are two opposite directions including upward direction 8U (not shown) and downward direction 8D that are parallel to first axis 8. For second axis 18 there are two opposite directions including inward direction 18I and outward direction 18O that are parallel to second axis 18. Outward direction 18O is generally in a direction extending away from motorcycle 6. Outward direction 18O is also along the direction from the arch to the outside of the rider's foot. For third axis 20 there are two opposite directions including forward direction 20F and rearward direction 20R that are parallel to third axis 20. Forward axis 20F is generally the direction from the heel toward to the ball of the rider's foot.

According to FIG. 2A, clasp 16 has upper portion 16U and lower portion 16L that are rigidly assembled together using fasteners or machine screws 17. In alternative embodiments clasp 16 may be assembled together using any of conventional methods such as rivets, welding, an interference fit, or combinations thereof. Clasp 16 is mounted to a support portion 19 (FIG. 3) that is attached to motorcycle 6 in a manner that is similar or the same to that of a conventional motorcycle footpeg. Together clasp 16 and support 19 form a novel footpeg 12 and thereby replace a conventional footpeg.

Clasp 16 defines an opening 22 that passes through the clasp along the first axis 8. The opening 22 defines forward facing gap 24 in clasp 16. Gap 24 is defined between two forward extending inward 26 and outward 28 portions of clasp 16. The term "forward" as recited herein refers to a direction 20F along axis 20. In the disclosed embodiment opening 22 is laterally enclosed on three sides by a generally U-shaped boundary of clasp 16, which opens in forward direction 20F.

Inward portion 26 of clasp 16 is closer to the motorcycle body 6 than outward portion 28. Stated another way, the footpeg 12 extends outwardly from motorcycle 6 in a direction from inward portion 26 toward outward portion 28. In use the inward portion 26 is adjacent to the arch or inside portion of sole 14 and the outward portion is adjacent to an outer portion of sole 14 of footwear 10.

Inward portion 26 of clasp 16 includes a clasp lip 30 that is adjacent to opening 22. Clasp lip 30 extends in an outward direction along second axis 18. A resilient member or spring 32 is disposed upon outer portion 28 of clasp 16 and adjacent to opening 22. Thus clasp lip 30 and spring 32 are in relatively opposing locations across opening 22. While resilient member 32 is depicted as being a metal spring, other designs may incorporate elastomers, plastics, or geometries that provide the function of resilient member 32.

Clasp 16 has a chamfered upper surface 34 that generally follows the U-shaped outline. This chamfer 34 generally facilitates a hook to be inserted into clasp 16 along the first axis 8.

Clasp 16 is pivotally mounted relative to footpeg 12 so as to rotate relative to support 19 about an axis 36 parallel to second axis 18. The axis of rotation 36 is proximate to the gap between the most forward extent of inward portion 26 and outward portion 28 of clasp 16. Clasp 16 includes springs 38 that rotationally bias or urge clasp 16 toward a position whereby it is parallel to support 19. Clasp can then be rotated such that a rear closed portion 40 of clasp 16 can be elevated relative to support 19.

FIG. 3 is an embodiment of footpeg 12 having a texture or knurling on upper surface 35 of clasp 16. Otherwise this clasp 16 is the same as that depicted in FIGS. 2A-C. This texture may be accomplished by forming grooves in surface 35 such as rectangular grooves that may follow along axes 18 and 20. Of course many such patterns and geometries are possible to provide this texture. Also various other types of surfaces can be utilized on upper surface 35 to affect engagement or a coefficient of friction between upper surface 35 and sole 14.

Figures 4A, 4B, 4C:
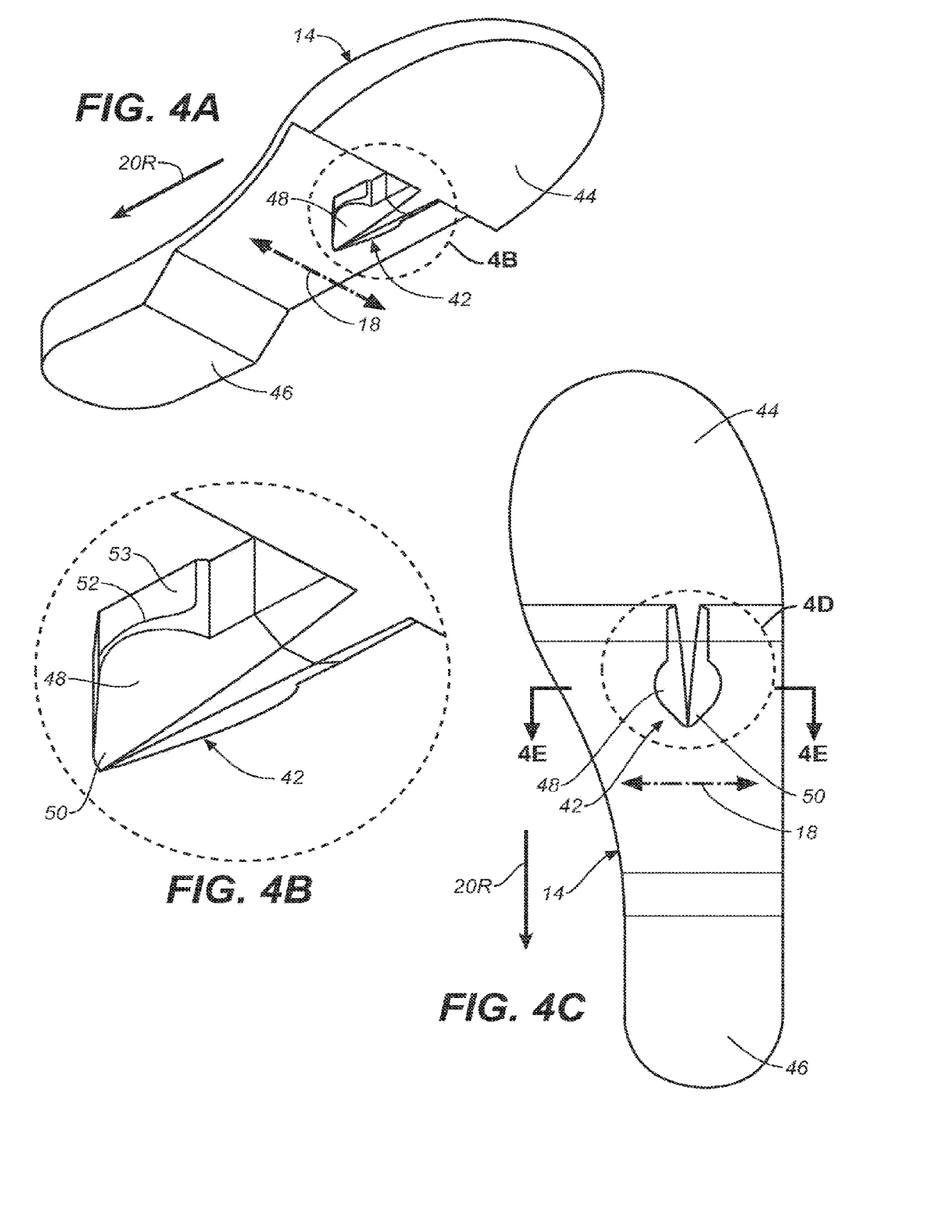
FIG. 4A is an isometric view looking upward at the bottom of sole 14 having hook 42.
FIG. 4B is a detailed isometric view taken from detail 4B of FIG. 4A.
FIG. 4C is a bottom view looking upward at sole 14 having hook 42.
Figure 4D:
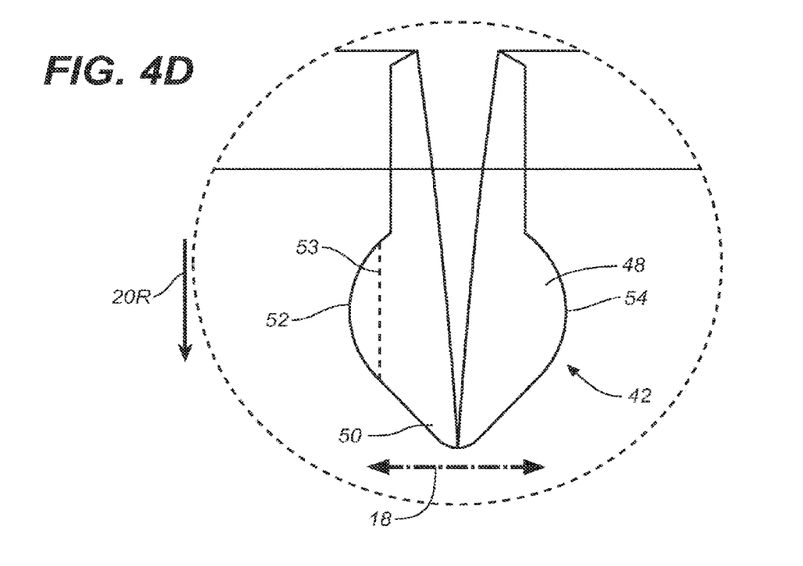
FIG. 4D is a detailed bottom view taken from FIG. 4C.
Figure 4E:
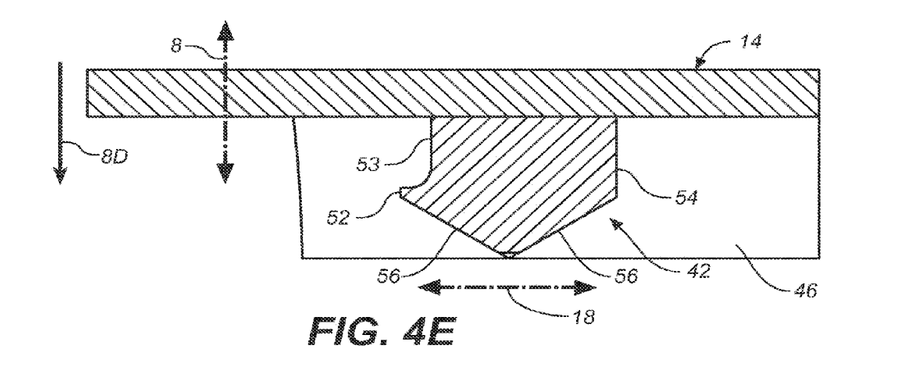
FIG. 4E is a cross-sectional view taken from FIG. 4C.

A sole 14 having hook 42 is depicted in FIGS. 4A-E. FIG. 4A is a perspective view of the bottom of sole 14. FIG. 4B is a detail view taken from FIG. 4A. FIG. 4C is a bottom face view of sole 14 looking upward. FIG. 4D is a detail view taken from FIG. 4C. FIG. 4E is cross section view taken from FIG. 4C. Directions and axes shown on in FIGS. 4A-D correspond to those depicted in earlier FIGS. according to a proper positioning or engagement of the sole 14 with respect to the footpeg 12 having clasp 16.

Sole 14 includes ball support 44 and heel support 46. Hook 42 extends from ball support 44 toward heel support 46 in a rearward direction 20R that is opposite the direction 20F. Hook 42 has a flared portion 48 and a tapered portion 50. The flared portion 48 includes a hook lip 52 extending over a narrowed portion 53 and an opposing surface 54. Hook lip 52 over narrowed portion 53 and opposing surface 54 are disposed on opposing sides of hook 42 with respect to second axis 18. Thus hook 42 is asymmetric with respect to second axis 18. Tapered portion 50 extends from flared portion in the rearward direction 20R. Tapered portion 50 facilitates engagement between hook 42 and clasp 16 along the third axis 20.

Flared portion 48 includes angled surfaces 56 that define a taper in the downward direction 8D. This facilitates insertion and engagement of hook into clasp along the direction 8D. In a preferred embodiment, hook 42 does not extend along axis 8 beyond a plane that is defined between and intersects the ball support 44 and heel support 46. This is preferable to allow a rider to comfortably walk using footwear 10 and to avoid excessive damage or wear to hook 42 while the rider is walking. Otherwise walking along abrasive surfaces such as a sidewalk may quickly wear out and reduce effectiveness of hook 42.

In a first embodiment hook 42 is formed integrally with sole 14. In a second embodiment hook 42 is integrally molded with sole 14. In a third embodiment hook 42 is insert molded with sole 14. In a fourth embodiment hook 42 is separately attached to sole 14. Some existing riding boots 10 have replaceable soles 14. A replacement sole 14 with incorporated hook 42 is a way to retrofit an existing boot 10 to work with clasp 16.

According to a fifth embodiment hook 42 is spring loaded along the first axis 8. A spring (not shown) urges hook 42 into the position depicted in FIGS. 4A-E along the first axis 8. The spring applies a force to hook 42 in the direction 8D. If a sufficient force opposing this force is applied to the hook in a direction opposite to direction 8D, the hook is pushed up into sole 14 along first axis 8. When the force is released hook 42 returns to the position as depicted in FIGS. 4A-E. This allows hook 42 to retract when the rider steps down without being properly aligned for hook 42 to be received into clasp 16.

Figure 5A:
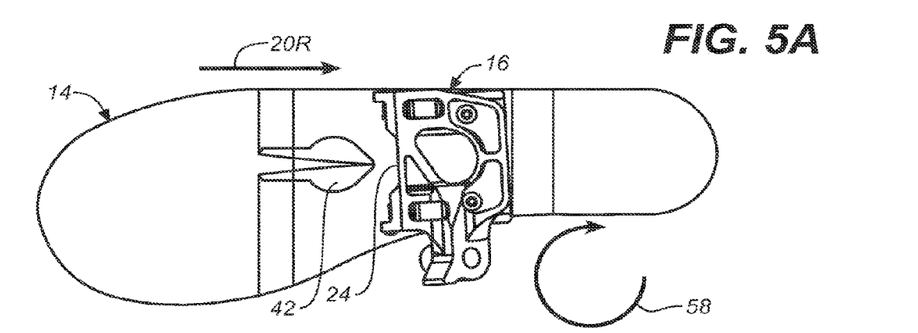
FIG. 5A is a bottom view looking upward at sole 14 and clasp 16 and depicting the hook 42 out of engagement relative to clasp 16.
Figure 5B:
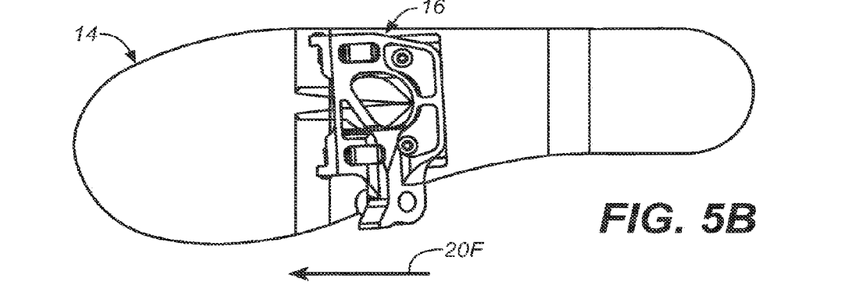
FIG. 5B is a bottom view looking upward at sole 14 and clasp 16 and depicting hook 42 in engagement relative to clasp 16.

FIGS. 5A and 5B are bottom views depicting a sequence of disengagement and then engagement between hook 42 and clasp 16 respectively. Between the positions in FIGS. 5A and 5B, sole 14 is linearly displaced in the rearward direction 20R. Hook 42 is thereby received through the forward facing gap 24 and into opening 22. Thus the sequence from FIG. 5A to FIG. 5B represents a sequence of engagement of hook 42 into clasp 16. Referring back to FIGS. 4C and 4D hook 42 has tapered portion 50 that tapers in direction 20R. As is apparent, the taper facilitates ease of engagement of hook 42 with opening 22 so that sole 14 does not have to be precisely aligned with clasp 16 in order to achieve proper engagement between hook 42 and clasp 16. One added benefit of this system is that in additional to providing vertical restraint along first axis 8, the sole is restrained from moving rearward in direction 20R while hook 42 is engaged with clasp 16.

Disengagement of the hook 42 from the clasp 16 may be accomplished by linearly displacing the sole 14 in the forward direction 20F relative to the clasp 16. Thus the sequence from FIG. 5B to FIG. 5A represents a sequence of disengagement of hook 42 from clasp 16. Thus forward disengagement is simple and convenient allowing the rider to easily access foot-activated gear shift and rear brake controls.

Element 58 is of FIG. 5B is indicative of another motion of disengagement of hook 42 from clasp 16. Because hook lip 52 only resides on a portion of flared portion 48 of hook 42, it is possible to rotate lip 52 out of disengagement according to the rotational direction 58.

Figure 6A:
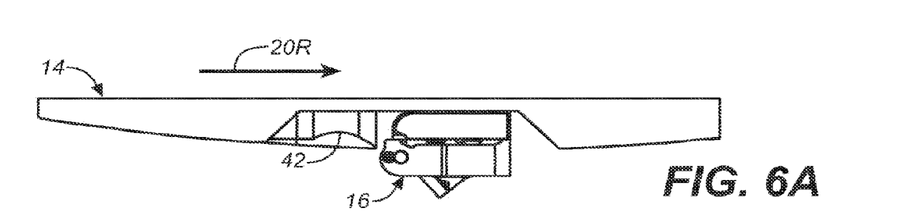
FIG. 6A is a side view of sole 14 depicting hook 42 out of engagement relative to clasp 16.
Figure 6B:
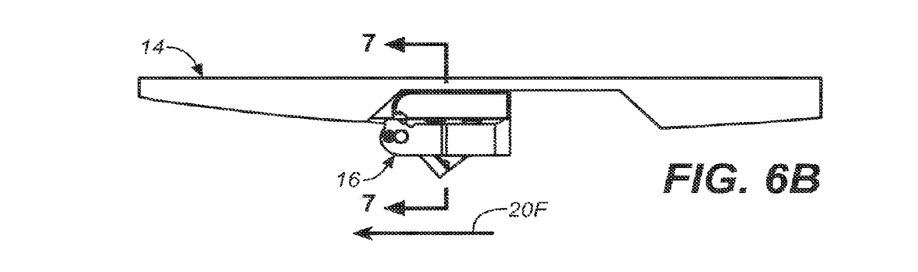
FIG. 6B is a side view of sole 14 depicting hook 42 in engagement relative to clasp 16.
Figure 6C:
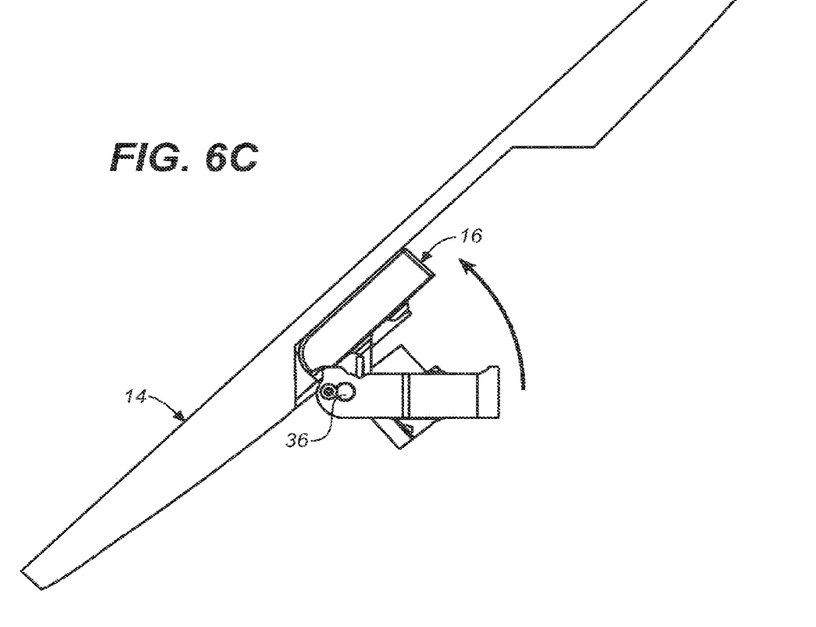
FIG. 6C is a side view of sole 14 depicting hook 42 in engagement relative to clasp 16 and with clasp 16 and sole 14 rotated with respect to axis 36.

FIGS. 6A and 6B depict the sequence of engagement (or disengagement) from a side view perspective of hook 42 into or out of clasp 16. FIG. 6C depicts a rotation of the clasp 16 along axis of rotation 36 while the hook 42 is engaged with the clasp 16. When a rider 4 sits upon motorcycle 6 the foot naturally rotates to a position such that the heel is elevated relative to the toe. This natural rotative elevation of heel relative to toe is illustrated in FIG. 1. This rotation may increase as the rider proceeds through turns. Thus providing the axis of rotation 36 of clasp relative to footpeg 12 maximizes the comfort for the rider 4.

Figure 7:
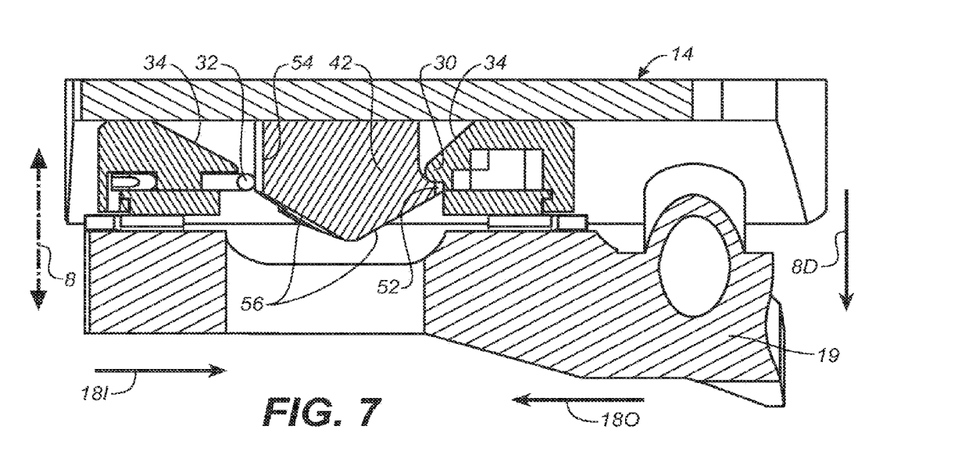
FIG. 7 is a cross sectional view taken from FIG. 6B.

FIG. 7 is a cross section taken from FIG. 6B depicting engagement between hook 42 and clasp 16. According to FIG. 7, hook lip 52 and clasp lip 30 overlap each other along axis 18 in order to provide restraint along axis 8. Clasp lip 30 extends along direction 180 toward narrowed portion 53 (see FIGS. 4B and 4E also) of hook 42. Resilient member 32 engages opposing surface 54 of hook 42 to facilitate the overlap of the hook lip 52 and the clasp lip 32. The rider may also enhance the overlap of hook lip 52 to clasp lip 30 by pressing inwardly (along direction 181) with boot 10. The overlap of hook lip 52 with clasp lip 30 thereby resists a linear extraction of hook 42 from clasp 16 along the axis 8.

As stated before, hook 42 can be engaged with clasp 16 via a linear motion in the rearward direction 20R of hook 42 relative to clasp 16. Alternatively the hook 42 can be engaged with clasp 16 by pressing hook 42 downwardly into opening 22 in a downward direction 8D which is downwardly along axis 8.

The flared portion 48 of hook 42 includes angled faces 56 that define a taper in the downward direction 8D. Clasp 16 also has the chamfered upper surface 34. The angled faces 56 and chamfered surfaces 34 both facilitate ease of alignment between hook 42 and opening 22. When hook 42 is pressed into opening 22, the resilient member 32 is pressed outwardly along second axis 18 (in direction 180) allowing hook 42 to pass into opening 22.

Figure 8A:
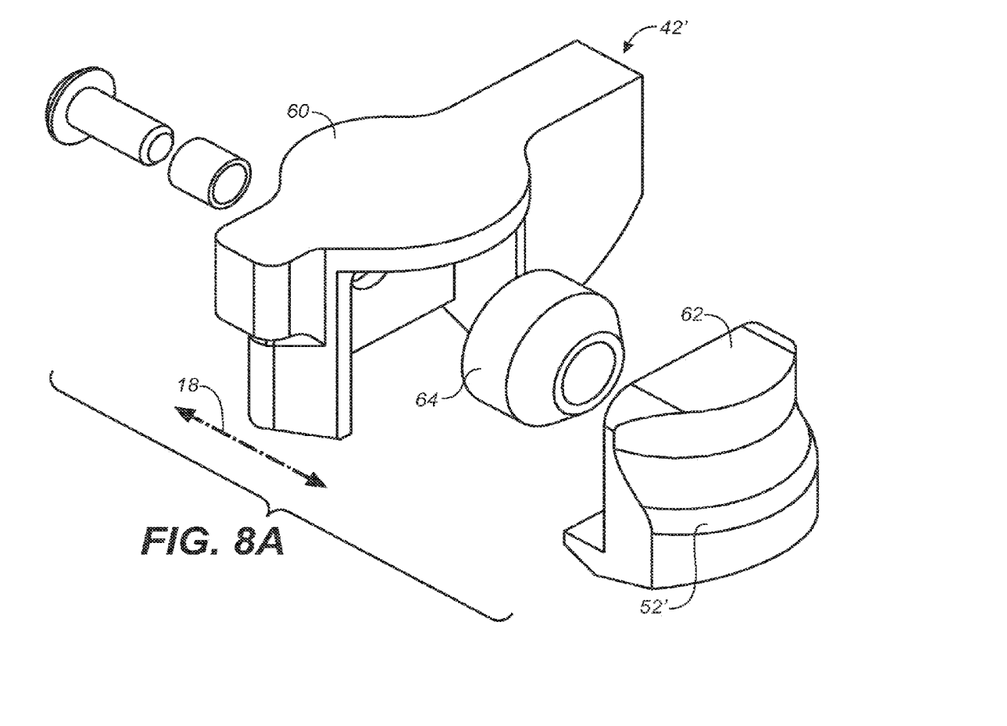
FIG. 8A is an exploded view of an alternative embodiment of hook 42'.

FIGS. 8A-E depict an alternative design for hook 42' that eliminates a need for a resilient member 32. FIG. 8A is an exploded assembly view of hook 42' including a fixed portion 60, a moveable portion 62, and an internal resilient member 64 that separates the fixed and moveable portions along axis 18. Moveable portion 62 of hook 42' includes hook lip 52'. This construction of hook 42' allows the moveable portion to displace along axis 18 through the compression and expansion of the internal resilient member 64 that acts as a spring coupling between fixed portion 60 and moveable portion 62 of hook 42'. Examples of internal resilient member suitable for the embodiment of FIG. 8A include springs, wave washers, elastomers, solenoids, and other features that provide a resilience between portions 60 and 62 along axis 18.

Figure 8B:
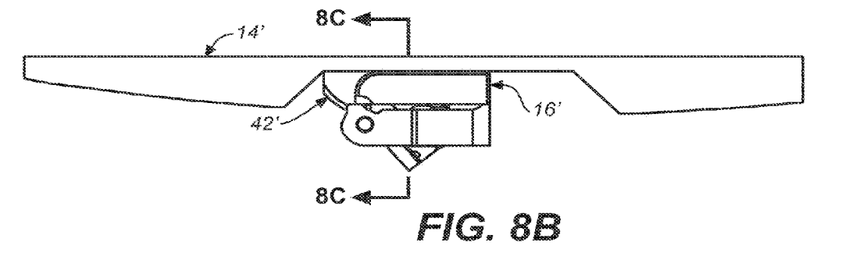
FIG. 8B is a side view depicting sole 14' coupled to clasp 16'.
Figure 8C:
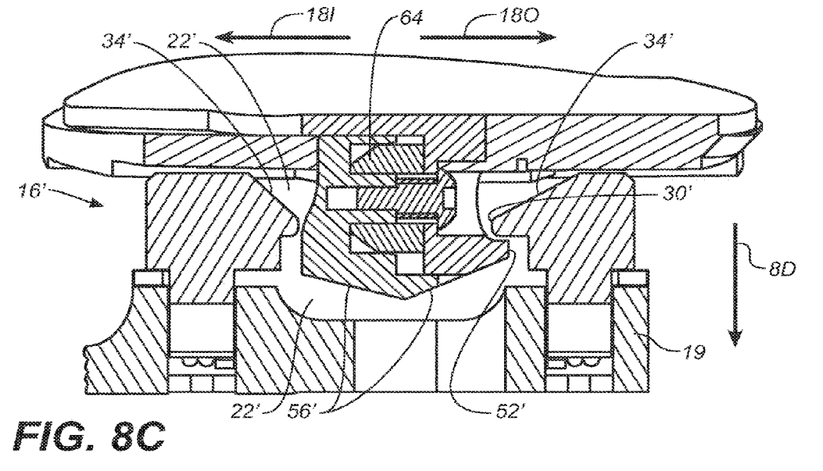
FIG. 8C is a cross sectional view taken from FIG. 8B.
Figure 8D:
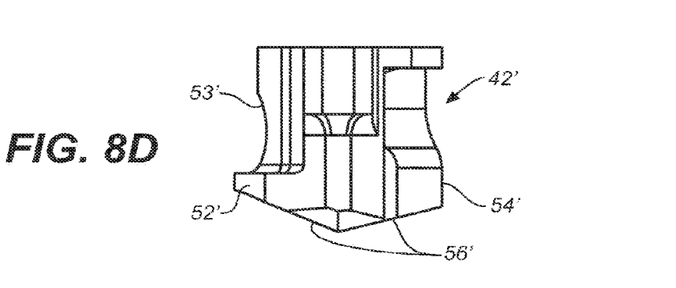
FIG. 8D is a side view of alternative hook design 42'.
Figure 8E:
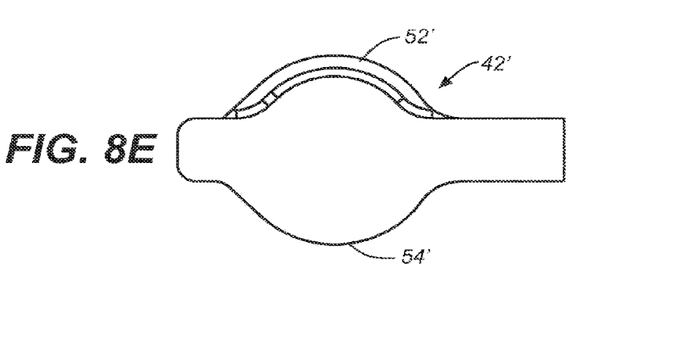
FIG. 8E is a top view (looking away from sole 14') of hook 42'.

FIG. 8B is a side view of sole 14' with hook 42' engaged with clasp 16'. FIG. 8C is a cross-section view taken from FIG. 8B. FIG. 8D is a side view and FIG. 8E is a top view of hook 42'. Hook 42' is very similar to hook 42 except that the function that was provided by resilient member 32 in clasp 16 is now provided by the resilient member 64 in hook 42'.

The engagement between hook 42' and clasp 16' is depicted in FIG. 8C. As hook 42' is pressed into opening 22' along direction 8D surfaces 56' of hook 42' engage chamfered surfaces 34' of clasp 16'. This engagement results in alignment forces between hook 42' and opening 22'. Also, the engagement produces a lateral compression force that compresses resilient member 64 in along axis 18. The lateral compression force causes hook lip 52' to displace in direction 180 (away from motorcycle along axis 18) direction in order to clear clasp lip 30'. When hook 52' has cleared clasp lip 30' it then snaps back in the 181 direction (toward motorcycle along axis 18) into the engagement position.

The specific embodiments and applications thereof described above are for illustrative purposes only and do not preclude modifications and variations encompassed by the scope of the following claims.

What is claimed is:

1. An apparatus for restraining a rider's footwear along a first axis to a motorcycle footpeg, the footpeg extending laterally away from the motorcycle along a second axis, the footwear having a heel support and a ball support disposed along a third axis, wherein the first axis, the second axis and the third axis are mutually perpendicular to each other, the apparatus comprising:

a hook extending downwardly from the bottom of the footwear along the first axis and laterally along the third axis from the ball support and toward the heel support, the hook having a flared section and a tapered section along the extent toward the heel support, the hook having a hook lip; and a clasp rotatingly mounted to the footpeg, the clasp defining an opening that passes through the clasp along the first axis and defining a gap facing forwardly along the third axis allowing access to the opening along the third axis, the clasp having a clasp lip peripherally adjacent to the opening and disposed to overlap the hook lip, the clasp configured to:

receive the hook for engagement along the first axis, whereby the rider presses the hook into the clasp along the first axis until the clasp engages the hook by the overlapping hook lip and clasp lip to restrain motion of the hook along the first axis;

additionally receive the hook for engagement along the third axis, whereby the rider presses the hook into the clasp along the third axis until the clasp engages the hook by the overlapping hook lip and clasp lip to restrain motion of the hook along the first axis; and rotate around a pivot line along the second axis;

whereby the rider can selectively engage the hook and clasp by pressing downwardly with the footwear along the first axis or by moving the footwear along the clasp in a rearward motion along the third axis; and whereby the rider can disengage the hook and clasp by moving the footwear along the clasp in a forward motion in the third axis.

* * * * *